United States Patent [19]

Sick

[11] Patent Number: 4,899,964

[45] Date of Patent: Feb. 13, 1990

[54] PLASTIC PIPE LINE HOLDER

[75] Inventor: Hans-Hermann Sick, Kaiserslautern, Fed. Rep. of Germany

[73] Assignee: TRW United Carr GmbH & Co., Enkenbach-Alsenborn, Fed. Rep. of Germany

[21] Appl. No.: 302,423

[22] Filed: Jan. 26, 1989

[30] Foreign Application Priority Data

Jan. 29, 1988 [DE] Fed. Rep. of Germany ....... 3802698

[51] Int. Cl.$^4$ .............................................. F16L 3/22
[52] U.S. Cl. ...................................... 248/68.1; 24/459
[58] Field of Search ...................... 248/68.1, 65, 67.7, 248/73, 71, 49, 316.1, 316.3, 316.2; 24/459, 336; 411/510

[56] References Cited

U.S. PATENT DOCUMENTS

| 3,894,706 | 7/1975 | Mizusawa | 248/68.1 |
| 4,118,838 | 10/1978 | Schiefer et al. | 248/68.1 X |
| 4,347,998 | 9/1982 | Loree | 248/68.1 |
| 4,550,891 | 11/1985 | Schaty | 248/68.1 |
| 4,660,790 | 4/1987 | Muz | 248/68.1 |
| 4,669,156 | 6/1987 | Guido et al. | 24/336 |
| 4,728,236 | 3/1988 | Kraus | 411/510 X |
| 4,775,121 | 10/1988 | Carty | 248/68.1 |

Primary Examiner—Ramon O. Ramirez
Attorney, Agent, or Firm—Fay, Sharpe, Beall, Fagan, Minnich & McKee

[57] ABSTRACT

The invention relates to a line holder device 1 formed of plastic and especially suited for holding and supporting pipelines. The holder 1 includes a fastening zone 2 for fastening to a support, with at least one holding zone 3, 4 for the stopped support of a pipeline. A locking element 5 is provided for securing the pipeline in the holding zone. The holding zone or zones 3,4 are wedged in a closed position by the locking element 5, designed as a wedge clamp 6. The wedge clamp has a number of closing elements 9 to 18, which strike against the holding zone 3,4 and/or the fastening zone 2, on the inside and/or the outside.

16 Claims, 1 Drawing Sheet

PLASTIC PIPE LINE HOLDER

BACKGROUND OF THE INVENTION

The invention relates to a holding device formed of plastic and especially intended for holding pipelines. The holder includes a fastening zone for connection to a support, with at least one holding zone for the fixed positioning of a pipeline, and with a locking element for securing the pipeline in the holding zone.

Already known, as state of the art, is such a line holder formed of plastic with a locking element connected in hinge fashion with the line holder. The locking element can be locked with the holder through catch projections (See German Utility Model 82 13 664.5).

Because of changes in auto engine technology, including the use of catalysts, aerodynamic linings and noise insulated motor chambers, there has resulted higher ambient temperatures about the line holders. As can be appreciated, constant high holding force is required of the line holders. However, the polymer materials from which the holders are formed tend to soften at higher temperatures. As a consequence, the holding forces tend to decrease at the higher temperatures. It has been sought to compensate for this by using, in the above-mentioned prior art construction, closing clamps which are intended to prevent the pipe from sliding out of the snap-in holders. On the application of a load, however, the snap elements in each case bend so far that the pipe slides out. The holding of the pipe is thus relatively insecure. For geometric and space reasons, the closing clamp can be shaped only relatively soft to allow bending. The hinge forms an additional weak point.

Another possibility, in the state of the art, for providing line holders for use at higher temperatures, consists of the use of materials having greater temperature resistance. But these materials are also hard and brittle at room temperature and often subject to tension cracks. Thus, neither snap construction nor pressure seating can be satisfactorily realized in practice.

The problem of the present invention, therefore, is to provide a line holder formed of plastic, of the kind mentioned, which is elastic enough at room temperature to allow an easy snap mounting of the pipeline, but on the other hand, is still rigid enough that the required holding forces can still be applied at high temperatures when the material begins to soften.

SUMMARY OF THE INVENTION

This problem is solved, according to the invention, by the fact that the pipeline holding zone is wedged by a locking element, designed as wedge clamp. In this way, the advantage results that all the holding zones are wedged closed, after mounting, so that the line holder is, in itself a compact and rigid unit. Bending tensions in small cross sections are avoided; and, mainly pressure tensions occur.

Only the total cross section of the line holder is under bending stress. For the wedging is used the locking element, designed as a wedge clamp, which is so shaped that the fastening zone is also wedged with it. The line holder is, for example, as up to now, pressed onto a bolt, and the pipelines are snapped into the pipeline receivers. Then the wedge clamp is pushed into place. It wedges both the bolt and the pipeline receivers.

Unlike a conventional closing clamp, this line holder according to the invention is not under bending stress, but rather, the closing elements are pressure weighted. Since the wedge clamp is not under tension stress, it can be fastened to the line holder with ordinary snap elements.

BRIEF DESCRIPTION OF THE DRAWING

The invention is described in detail below from an example of execution represented in the drawing wherein.

Figure 1:
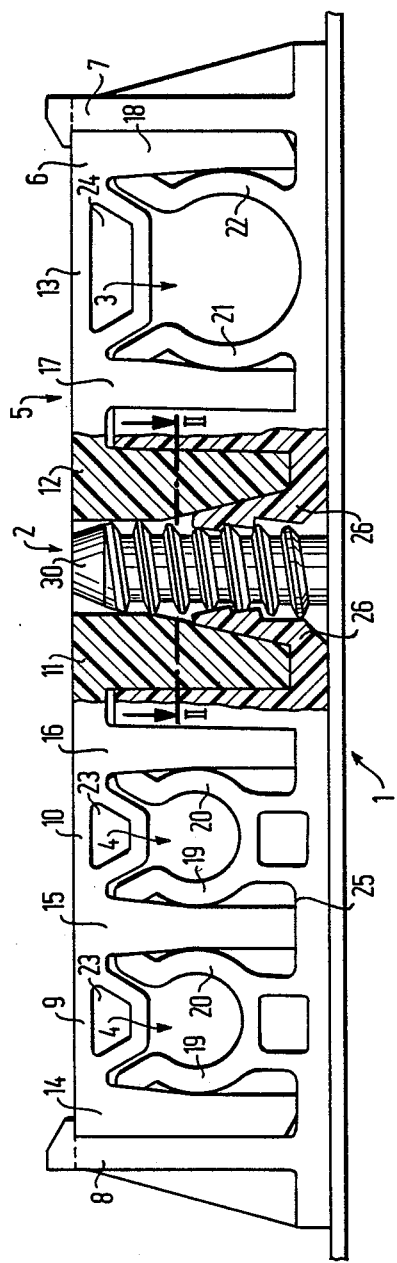
FIG. 1 is a side view of the line holder according to the invention with the central section partly broken away; and, FIG. 2 is a section along the line II—II in FIG. 1.

The preferred embodiment of the line holder of the invention is shown in FIG. 1. It is molded from a resinous plastic material and is intended for holding pipe lines or tubes not shown in detail. The holder 1 includes a fastening zone 2 for joining the holder to a support element. This fastening zone 2 has fastening means, for example, resilient, elastic holding projections 26 which carry stepped tooth forms that are engaged in a manner known per se, between the thread of a threaded bolt or stud 30 which is welded or otherwise fastened to a support base, not shown in detail. The elastic holding projections 26 are shown and described more fully in U.S. Pat. No. 4,728,236.

On both sides of the fastening zone 2, the line holder has holding zones 3 and 4. The holding zone 3 has holding members in the form of resilient half-shells 21 and 22, for the holding of a pipe of greater diameter, while the holding zone 4 has two somewhat smaller resilient half-shell pairs 19 and 20, for the holding of two pipelines of smaller diameter.

The holding zones 3 and 4 are wedged in a closed, non-release position by a locking means comprising a locking element 5, designed as a wedge clamp 6. The fastening zone 2 can also be wedged to a closed, non-release position through this locking element 5.

As can be seen, the locking element 5, which forms the wedge clamp 6, is secured in its mounted or locked position through snap elements 7 and 8 located at its outer end zones. The elements 7 and 8 are joined integrally with the line holder 1. Also, it should be noted that these snap elements 7 and 8 have holding projections, not shown in detail, which extend laterally inwardly over the upper side of the wedge clamp 6 to grip and secure it in the mounted position shown in FIG. 1. The wedge clamp 6 can thus be pushed onto the line holder 1, and is held in the mounted position by the snap elements 7 and 8 and their holding projections.

The wedge clamp 6 has, in the zones directed toward the holding zones 3 and 4 and the fastening zone 2, wedge shaped closing elements 9 to 18. These closing elements 9 to 18 can strike against the holding zones 3 and 4 and/or the fastening zone 2, from the inside and/or the outside as shown to prevent undesired opening or release movement of the associated holding or fastening zone.

In forming the holding zones 3 and 4 through half-shells 19 and 20 or 21 and 22, closing elements 9, 10 and 13 are provided. These elements are designed with a trapezoid form and are arranged to enter into the corresponding push-in zones of the half-shells 19 and 20 or 21 and 22 of the holding zones 3 and 4. Laterally of closing elements 9, 10 and 13 are wedge shaped arms or closing elements 14 and 15 or 16, 17 and 18, which lie on opposite sides of associated trapezoid closing elements 9, 10 and 13. Thus, each half-shell, 19 and 20, or 21 and 22, is closed and locked in position by the closing elements 9-14-15 or 10-15-16 or 13-17-18. Here, in each instance the wedge shaped arms reach into the zone 25 beneath the half-shells 19, 20, 21, 22.

Figure 2:
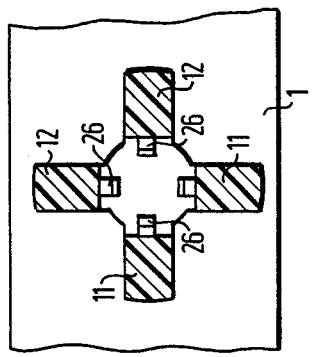

As explained above, the fastening zone 2 of the line holder 1 can also be locked by wedge shaped arms or closing elements 11 and 12 of the wedge clamp 6. For this purpose, according to FIGS. 1 and 2, there are four closing elements 11 and 12 distributed about the circumference of the fastening zone 2. The closing elements 11 and 12 are designed as wedge shaped arms which engage behind the elastically designed catch projections 26 of the line holder and are imbedded in the interspaces adjoining the latter. Thus, as shown in FIG. 1, when the catch projections 26 are in their closed position in which they are imbedded by their front teeth in the threads of the bolt 30. They are held in this position through the closing elements 11 and 12.

Through the cooperation of the line holder 1 with the locking element 5, designed as a wedge clamp 6, both the holding zones 3 and 4 and the fastening zone 2 are wedged by the corresponding closing elements, so that, as a whole, a compact and rigid unit is produced.

The line holder 1 is clipped, as up to now, on the bolt 30, while the elastic catch projections 26 are imbedded, as described above, in the threads of the bolt. Then the corresponding pipelines, not shown in detail, are clipped into the holding zones 3 and 4 and held by the half-shells 19 and 20 or 21 and 22. Thereafter, the wedge clamp 6 is pushed on and held by the snap elements 7 and 8. With this, the mounting is completed. The wedge clamp 6 wedges, by its closing elements 9 to 18, both the fastening zone 2 with the bolt 30, and also, the holding zones 3 and 4 with their half-shells 19 and 20 or 21 and 22.

The locking effect of this self-contained unit, consisting of line holder 1 and wedge clamp 6, may be increased if the wedge clamp 6 is injection molded from especially rigid material, for example, material highly reinforced with glass fibers. The use of such material is possible since the wedge clamp 6 has no elastic function. The line holder 1, on the other hand, may consist of an ordinary polymer material having a degree of elasticity and resiliency.

As a whole, the subject invention provides a compact unit which can perform its function perfectly and apply constant high holding forces even with higher use temperatures. The wedge shaped arms of closing elements 14, 15, 16, 17 and 18, as well as 11 and 12, are so shaped in their outer surface, that, on the one hand, they are fitted against the neighboring surface of the half-shells, but, on the other hand, because of their wedge shape, give a perfect closing effect.

Instead of the three pipe lines with the holding zones 3 and 4, it is also possible to provide still other holding zones, or to equip the fastening zone with another part, instead of the bolt 30. In any case, it is assured that through the wedge clamp 6 with its closing elements, at least one holding zone 3 and the corresponding fastening zone 2 is so wedged by specially shaped closing elements, that in the cooperation between the line holder 1 and the wedge clamp 6, a compact, self-contained unit is given.

The invention has been described with reference to a preferred embodiment. Obviously, modifications and alterations will occur to others upon the reading and understanding of this specification. It is intended to include all such modifications and alterations as part of the invention insofar as they come within the scope of the appended claims or the equivalents thereof.

What is claimed is:

1. A plastic holding device for mounting and holding elongated members such as pipelines comprising:
    a holding member including fastening means for connecting the holding member to a support, said holding member further including at least one holding element for resiliently receiving and holding a pipeline; and,
    a locking means for releasably engaging said holding element and preventing removal of a pipeline positioned therein, said locking means including at least one first wedge element for engaging said holding element and at least one second wedge element for engaging said fastening means and preventing disconnection of said fastening means from said support.

2. The holding device of claim 1 wherein said locking means is releasably connected to said holding member by retaining means carried on said holding member.

3. The holding device of claim 2 wherein said retaining means comprises at least one snap element which resiliently engages over said locking means.

4. The holding device of claim 1 wherein said first and second wedge face toward said holding element and said fastening means, respectively.

5. The holding device of claim 1 wherein said first wedge elements engage on the interior of said holding element.

6. The holding device of claim 4 wherein said first wedge element engages in an opening leading to said holding element.

7. The holding device of claim 6 wherein said first wedge element has a trapezoidal cross-section.

8. The holding device of claim 7 wherein said first wedge element is hollow.

9. The holding device of claim 6 wherein said holding element comprises opposing generally semi-cylindrical shell sections and said locking means includes arm means which engage on the exterior of said shell sections to prevent separation of said shell sections.

10. The holding device of claim 9 wherein said arm means extend substantially the fully length of said shell sections.

11. The holding device of claim 9 wherein said opposing generally semi-cylindrical shell sections are each engaged between a first wedge element and an arm means.

12. The holding device of claim 9 wherein said arm means having an elongated wedge configuration.

13. The holding device of claim 1 wherein said fastening means comprises at least one resilient catch member and said second wedge element acts to prevent movement of said at least one catch member.

14. The holding device of claim 13 including a plurality of said resilient catch member positioned about a fastening zone with each catch member associated with a separate first wedge element.

15. The holding device of claim 1 wherein said holding member is formed from a relatively resilient polymer material and said locking means is formed from a material highly filled with glass fiber.

16. A plastic holding device for mounting and holding elongated members such as pipelines comprising:

a holding member including fastening means for connecting the holding member to a support, said holding member further including at least one holding element for resiliently receiving and holding a pipeline; and, a locking means for releasably engaging said holding element and preventing removal of a pipeline positioned therein, said locking means further including wedge means for engaging said fastening means and preventing disconnection of said fastening means from said support.

* * * * *